United States Patent

Bae et al.

(10) Patent No.: US 7,703,055 B2
(45) Date of Patent: Apr. 20, 2010

(54) METHOD AND SYSTEM FOR ENHANCING YIELD OF SEMICONDUCTOR INTEGRATED CIRCUIT DEVICES USING SYSTEMATIC FAULT RATE OF HOLE

(75) Inventors: Choel-hwyi Bae, Suwon-si (KR); Sang-deok Kwon, Seoul (KR); Min-geon Cho, Seoul (KR); Gwang-hyeon Baek, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 560 days.

(21) Appl. No.: 11/698,029

(22) Filed: Jan. 26, 2007

(65) Prior Publication Data

US 2007/0180412 A1    Aug. 2, 2007

(30) Foreign Application Priority Data

Jan. 27, 2006    (KR) .................. 10-2006-0008700

(51) Int. Cl.
*G06F 17/50*    (2006.01)
(52) U.S. Cl. .............................. 716/4; 716/5
(58) Field of Classification Search .............. 716/4, 716/5, 8, 10, 11
See application file for complete search history.

(56) References Cited

U.S. PATENT DOCUMENTS 6,420,077 B1 *   7/2002   Chen et al. .................. 430/30

FOREIGN PATENT DOCUMENTS

| JP | 11-044664 | 2/1999 |
|----|-----------|--------|
| KR | 1998-013066 | 6/1998 |
| KR | 10-1999-0003154 | 1/1999 |
| KR | 10-2005-0059904 | 6/2005 |

\* cited by examiner

*Primary Examiner*—Sun J Lin
(74) *Attorney, Agent, or Firm*—Lee & Morse, P.C.

(57) ABSTRACT

A method of enhancing yield of semiconductor integrated circuit includes determining multiple experimental values, each experimental value corresponding to a distance from a side of a hole to an opposing side of a shape surrounding the hole, forming test patterns representing each of the experimental values on a wafer and calculating experimental value-based systematic fault rates from the test patterns; converting the experimental value-based systematic fault rates of the hole into the experimental value-based systematic fault rates, calculating a length of a side of the hole for which a distance between the side of the hole and the opposing side of the shape corresponds to each of experimental values, and calculating a systematic fault rate of the hole using the experimental value-based systematic fault rates per unit hole length and the length of the sides of the hole calculated for the respective experimental values in the desired layout.

20 Claims, 8 Drawing Sheets

METHOD AND SYSTEM FOR ENHANCING YIELD OF SEMICONDUCTOR INTEGRATED CIRCUIT DEVICES USING SYSTEMATIC FAULT RATE OF HOLE

BACKGROUND OF THE INVENTION

1. Field of the Invention

The invention relates to a method and system for enhancing the yield of semiconductor integrated circuit devices.

2. Description of the Related Art

With the rapid increase in the technological level and complexity of semiconductor circuit design, interest in Design For Manufacturability (DFM) is increasing. In particular, the development of a recommended rule for DFM methods is necessary in order to enhance semiconductor yields. The recommended rule has a value calculated from that of a minimum design rule by a predetermined amount.

In detail, the design of the layout of a semiconductor integrated circuit device depends on a minimum design rule value (or ground rule value). The minimum design rule value represents the limit of resolution in current photolithographic processing, and in particular, refers to the minimum space interval, the minimum overlap area or the like between various masks or within a mask used to manufacture the semiconductor integrated circuit device. However, when the related art technology fails to satisfy the minimum design rule value, the yield can only be rapidly enhanced by using a recommended rule value that is slightly higher than the minimum design rule value in the layout design of a semiconductor integrated circuit device.

SUMMARY OF THE INVENTION

The invention is therefore directed to a method and apparatus for enhancing the yield of semiconductor integrated circuit devices which substantially overcome one or more of the problems due to the limitations and disadvantages of the related art.

At least one of the above and other features and advantages of the invention may be realized by providing a method of enhancing the yield of semiconductor integrated circuit devices that may include determining multiple experimental values, where each experimental value may correspond to a distance from a side of a hole to an opposing side of a shape surrounding the hole, forming multiple test patterns that may represent each of the experimental values on a wafer and may calculate experimental value-based systematic fault rates from the multiple test patterns, converting the experimental value-based systematic fault rates of the hole into the experimental value-based systematic fault rates per unit hole length using a length of the sides of the hole of each of the test patterns, calculating a length of a side of the hole for which a distance between the side of the hole and the opposing side of the shape may correspond to each of experimental values in a desired layout, and calculating a systematic fault rate of the hole using the experimental value-based systematic fault rates per unit hole length and the length of the sides of the hole calculated for the each of experimental values in the desired layout.

At least one of the above and other features and advantages of the invention may by realized by providing a method of enhancing the yield of semiconductor integrated circuit devices that may include determining multiple experimental values, where each experimental value may correspond to a distance from a side of a hole to an opposing side of a shape surrounding the hole, forming multiple test patterns that may represent each of the experimental values on a wafer, counting a number of test patterns in which at least one fault occurs, among the multiple test patterns on the wafer that may correspond to each of experiment values, and measuring experimental value-based fault rates of the hole, classifying the measured experimental value-based fault rates into experimental value-based random fault rates and experimental value-based systematic fault rates, calculating a random fault rate and a systematic fault rate of the hole for a desired layout using the experimental value-based random fault rates and the experimental value-based systematic fault rates, and calculating a total fault rate of the hole in the desired layout using the random fault rate and systematic fault rate of the hole.

At least one of the sides of the hole may include multiple sub-sides, and distances between sub-sides of the hole and the opposite sides of the line may be different; and the calculating the length of the side of the hole, for which the distance between the side of the hole and the opposite side of the line corresponds to each of the experimental values, may include calculating a length of the sub-side of the hole, for which the distance between the sub-side of the hole and an opposite side of the shape may corresponds to each of the experimental values.

At least one of the above and other features and advantages of the invention may by realized by providing a system for enhancing the yield of semiconductor integrated circuit devices that may include a first storage unit storing multiple experimental values determined for distances between sides of a hole and opposing sides of a shape surrounding the hole, a second storage unit storing experimental value-based systematic fault rates of the hole calculated from multiple test patterns after the test patterns representing each of the experimental values have been formed on a wafer, a conversion unit that may convert the experimental value-based systematic fault rates into experimental value-based systematic fault rate per unit hole length using a length of sides of the hole of each of the test patterns, a first calculation unit calculating a length of a side of the hole, for which the distance between the side of a hole and the opposing side of the shape may correspond to an experimental value in a desired layout, and a second calculation unit that may receive the experimental value-based systematic fault rates per unit hole length from the conversion unit, and the length of the side of the hole calculated for each of experimental values in the layout of interest from the first calculation unit, and may calculate the systematic fault rate of the hole.

BRIEF DESCRIPTION OF THE DRAWINGS

The above and other features and advantages of the invention will become more apparent to those of ordinary skill in the art by describing in detail exemplary embodiments thereof with reference to the attached drawings in which.

DETAILED DESCRIPTION OF THE INVENTION

Korean Patent Application No. 10-2006-0008700 filed on Jan. 27, 2006, in the Korean Intellectual Property Office, and entitled: "Method and System for Enhancing Yield of Semiconductor Integrated Circuit Devices Using Systematic Fault Rate of Hole," is incorporated by reference herein in its entirety.

The invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In order to describe the invention in detail, embodiments according to the invention are described in detail with reference to the accompanying drawings.

Figure 1:
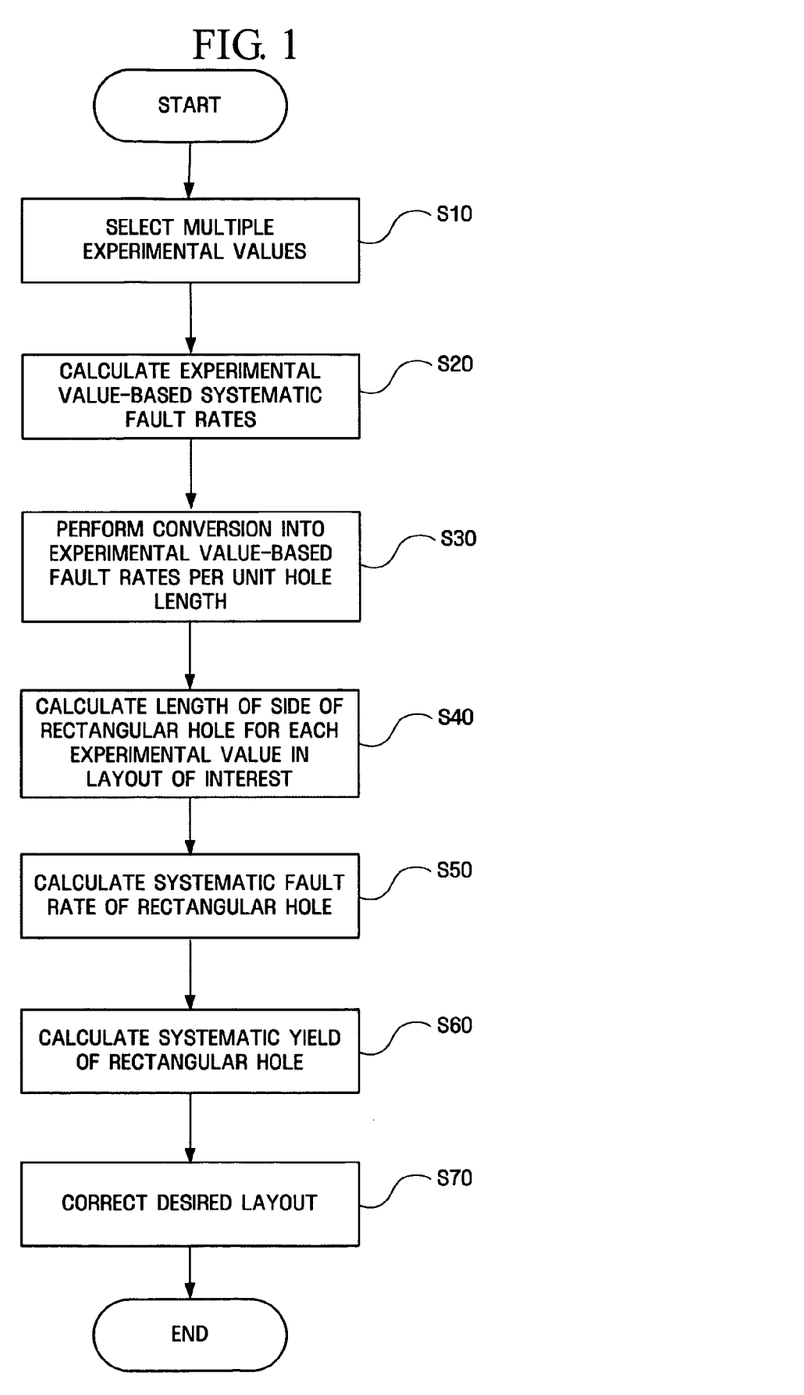
FIG. 1 illustrates a flowchart of a preferred method of enhancing the yield of semiconductor integrated circuit devices according to an embodiment of the invention.

FIG. 1 illustrates a flowchart of a method of enhancing the yield of semiconductor integrated circuit devices according to a preferred embodiment of the invention.

In FIG. 1, one or more experimental values (for example, n experimental values, n≧1) are determined for a hole 1, a shape 2 surrounding the hole, and the distance I between the sides of the hole 1 and the opposite sides of the shape 2 during step S10.

In detail, the experimental values in step S10 may be taken at increments of a predetermined interval from a Minimum Design Rule (MDR) value. In this case, the predetermined interval may be a design grid or a multiple of the design grid. For example, when the minimum design rule value is about 0.04 μm, and the design grid is about 0.01 μm, the determined experimental values may be values increased at increments of about 0.01 μm from about 0.04 μm to about 0.11 μm. Also, the largest (that is, about 0.11 μm) of the experimental values may be a value that allows the space between two lines to be sufficiently wide so as to generate few failures, which can be predicted from past experience.

Afterwards, experimental value-based systematic fault rates may be calculated at step S20.

In detail, step S20 may include multiple test patterns representing each of the experimental values being formed on a wafer. Then, the number of the test patterns in which a fault occurs may be counted for each of the experimental values, thus measuring the experimental value-based fault rates of the hole 1.

Figure 2:
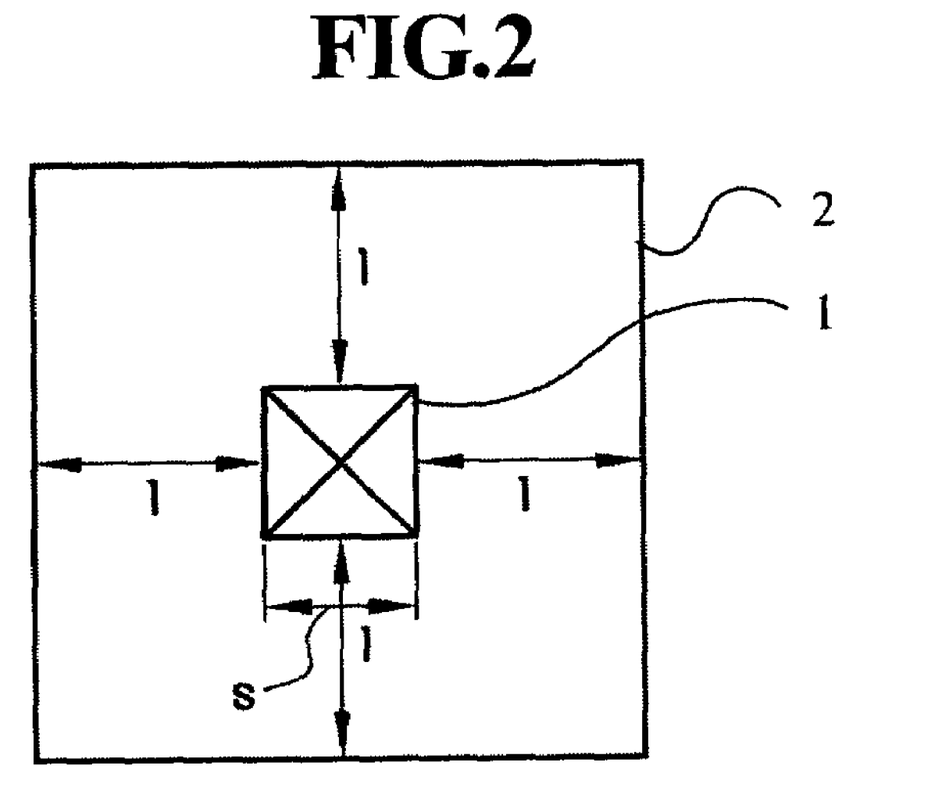
FIG. 2 illustrates a diagram of an example of a test pattern representing experimental values.

In this case, as illustrated in FIG. 2, in the test patterns representing each of the experimental values, the distances I between the sides of the hole 1 and the opposing sides of the shape 2 surrounding the hole 1 may be uniform. FIG. 2 illustrates the shape 2 as a 4-sided figure. However, the shape 2 may also be considered to be a closed line, a square, a rectangle or a polygon. The polygon may be a pentagon, a hexagon, a heptagon, an octagon, a nonagon, etc. The test patterns representing the respective experimental values may have similar forms, but the distances I may differ depending on the number of experimental values (in the former example, values taken at increments of about 0.01 μm from about 0.04 μm to about 0.11 μm). The test patterns are not limited to the shape shown in FIG. 2, and any appropriate test pattern may be used. In FIG. 2, s indicates the length of the sides of the hole 1.

Figure 3:
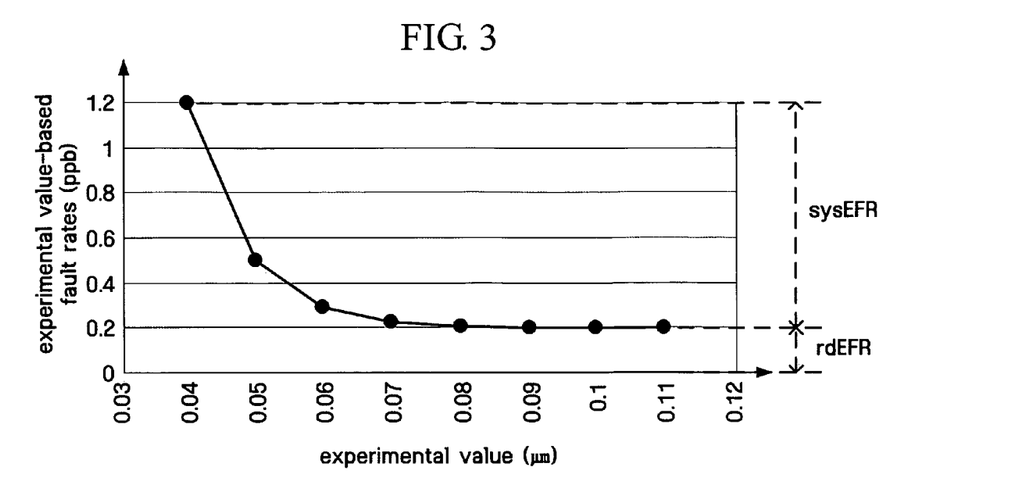
FIG. 3 illustrates a diagram of step S20 of FIG. 1.

The experimental value-based fault rates of the hole 1 may be measured as illustrated in FIG. 3. In FIG. 3, the x axis represents experimental values and the y axis represents experimental value-based fault rates. For example, at an experimental value of about 0.04 μm, the experimental value-based fault rate may be about 1.2 ppb (parts per billion), and at an experimental value of about 0.05 μm, the experimental value-based fault rate may be about 0.5 ppb.

Afterwards, the measured experimental value-based fault rates may be classified into experimental value-based random fault rates and experimental value-based systematic fault rates.

First, the difference between a random fault and a systematic fault is described. A random fault refers to a fault in which a semiconductor integrated circuit device malfunctions due to a particle or defect generated during the manufacturing process or the like. An example of a random fault may be when a conductive particle falls between two lines, so that a short circuit occurs between the lines. A systematic fault refers to fault occurring in the space between two lines or in the minimum enclosure of a line or a via. In these examples, the space between two lines may be excessively narrow, so that the lines may short-circuit, or the line or the via may not connect to the wiring.

The measured experimental value-based fault rates may converge to a predetermined value as the experimental value increases, as illustrated in FIG. 3. In this case, the experimental value-based random fault rate rdEFR may be a convergence value, and the experimental value-based systematic fault rate sysEFR may be the difference between the experimental value-based fault rate and the experimental value-based random fault rate. When, with respect to the hole 1 and the shape 2 surrounding the hole, the distance between the sides of the hole 1 and the opposite sides of the shape 2 become sufficiently large, there may be almost no problems because layouts are not systematically implemented. As a result, even if a defect occurs with respect to the hole 1 and the shape 2 surrounding the hole, the distance between the sides of the hole 1 and the opposite sides of the shape 2 may be sufficiently large. On the other hand, the fault may be a random fault in which a conductive particle falls between two lines in a manufacturing process, so that a short circuit occurs between the lines.

In this embodiment of the invention, experimental value-based fault rates may be measured for design rules related to the distances between the sides of the hole 1 and the opposing sides of the shape 2 surrounding the hole. These values may be classified into experimental value-based random fault rates and experimental value-based systematic fault rates. However, the invention is not limited to this measurement schema. That is, depending on the characteristics of the design rules, experimental value-based fault rates may be classified into experimental value-based random fault rates and experimental value-based parametric fault rates. Alternately, the experimental value-based fault rates may be classified into experimental value-based random fault rates and experimental value-based systematic fault rates+experimental value-based parametric fault rates.

Next, by using the length of the sides of the hole 1 of a test pattern, each of the experimental value-based systematic fault rates may be converted into a experimental value-based systematic fault rate per unit hole length at step S30.

In step S30, when the experimental value-based systematic fault is calculated from the test pattern illustrated in FIG. 2, the experimental value-based systematic fault rate of the hole 1 may be divided by the sum (4 s, see 's' of FIG. 2) of the lengths of four sides, i.e., the perimeter of the hole 1, thereby calculating the experimental value-based systematic fault rate sysEFRpL per unit hole length using Equation 1.

$$sysEFRpL = \frac{sysEFR}{4s} \quad \text{(Equation 1)}$$

Next, the length of the sides of a hole 1, for which the distance between the sides of the hole 1 and the opposing sides of a shape within a desired layout, i.e., a layout of interest, corresponds to each of the experimental values, may be calculated for each of the experimental values at step S40.

In step S40, the length of the sides of the hole 1 may be calculated for each of the experimental values, and the hole 1 that is a target within the desired layout may be a non-redundant hole. The non-redundant hole refers to a contact hole (or a via hole) used as a single contact (or a single via) connecting one wire to another wire. As a result, the signal delivery between wires may not occur smoothly when a fault occurs at the contact (or the via).

Figure 4A:
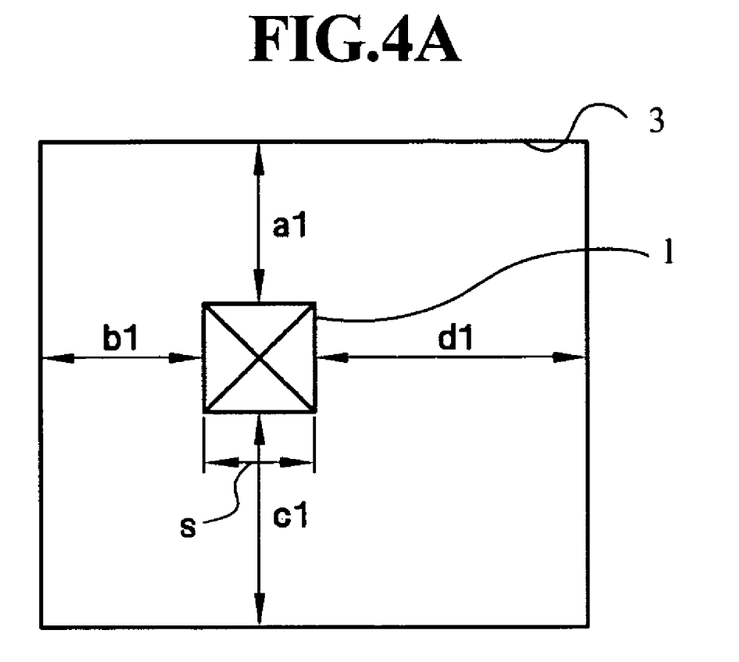
FIGS. 4A, 4B and 5 illustrate diagrams of step S40 of FIG. 1.
Figure 4B:
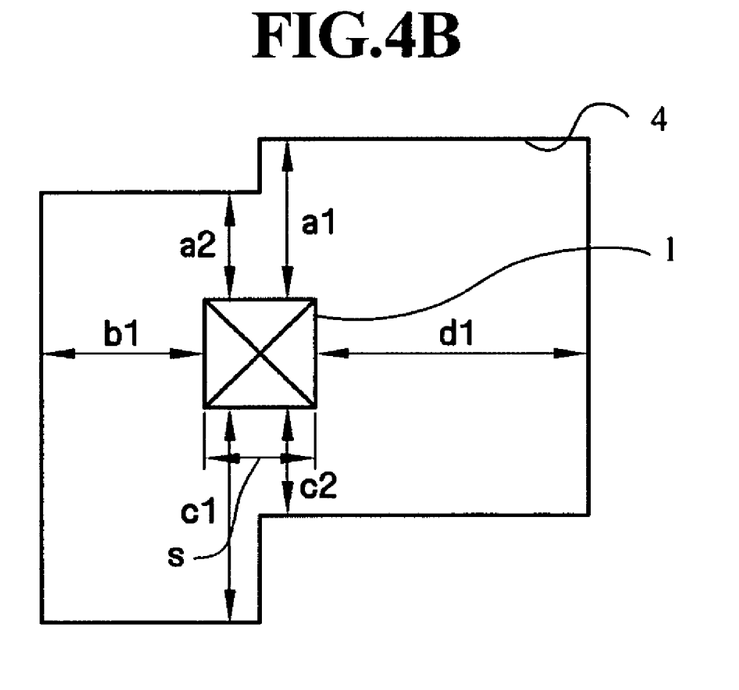

The method of calculating the length of the sides of a hole 1 within a desired layout is described with reference to FIGS. 4A and 4B. FIG. 4A illustrates the case in which the lengths between the four sides of the hole 1 and the opposing shape 3 may not be uniform (for example, a1=b1<c1 <d1). FIG. 4B illustrates the case in which the lengths between one side of the hole 1 and one opposite side of the shape 4 are not uniform (for example, a1≠a2, c1≠c2). That is, discontinuities or turns in the shape 4 may cause differing distances from the same side of the hole 1 (a1, a2 and c1, c2) to the opposing sides of shape 4. Alternately, at least one side of the hole 1 may be composed of multiple sub-sides, and the distances between the sub-sides of the hole 1 and the opposite sides of the shape 4 may be different. The shapes 3, 4 may also be considered to be squares, rectangles or polygons.

The lengths of the sides of the hole 1 calculated for each of experimental values in FIGS. 4A and 4B are summarized in Table 1. In FIG. 4A, the distance a1 between a side of the hole 1 and the opposing side of the shape 3 is about 0.06 μm, and the length of each side of the hole 1 is s. Meanwhile, in FIG. 4B, the distances a1 and a2 between a side of the hole 1 and the staggered opposing side of the shape 4 are about 0.06 μm and about 0.04 μm, respectively, and the length of each of the sub-sides of the hole 1 is s/2.

TABLE 1

| Experimental values (μm) | FIG. 4A | | FIG. 4B | |
|---|---|---|---|---|
| | Distance between side of hole and opposite side of line | Length | Distance between side of hole and opposite side of line | Length |
| 0.04 | | | a2, c2 | s/2, s/2 |
| 0.05 | | | | |
| 0.06 | a1, b1 | s, s | a1, b1 | s/2, s/2 |
| 0.07 | | | | |
| 0.08 | c1 | s | c1 | s |
| 0.09 | | | | |
| 0.10 | d1 | s | d1 | s |

Figure 5:
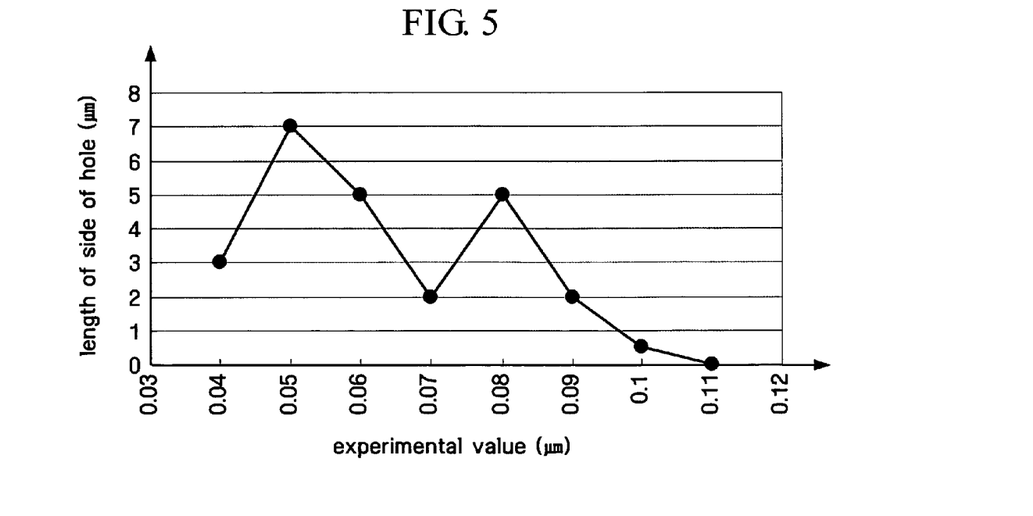

FIG. 5 illustrates the lengths of sides of the hole 1 calculated for each of experimental values. The x axis represents experimental values and the y axis represents the lengths of sides of a hole 1. For example, it may be seen that within a desired layout, the length of the side of the hole 1 which corresponds to an experimental value of about 0.04 μm may be about 3 μm, and the length of the side of the hole 1 which corresponds to an experimental value of about 0.05 μm may be about 7 μm.

Afterwards, the systematic fault rate of the hole 1 may be calculated using the experimental value-based systematic fault rate per unit hole length and the length s of the side of the hole 1, which may be calculated for each of the experimental values within the layout of interest at step S50.

In step S50, if the systematic fault rate of a hole 1 is sysFR, and the number of experimental values is n, then the experimental value-based systematic fault rate per unit hole length, which corresponds to a j-th experimental value, may be sysEFRpL(j), where sysEFRpL(j) has units of ppb/μm. From this, the length of the side of the hole 1, which may be calculated in relation to a j-th experimental value within the layout of interest, may be L(j), where L(j) has units of μm. The relationship may then be elucidated by Equation 2.

$$sysFR = \sum_{j=1}^{n} sysEFRpL(j) \times L(j) \quad \text{(Equation 2)}$$

Figure 6:
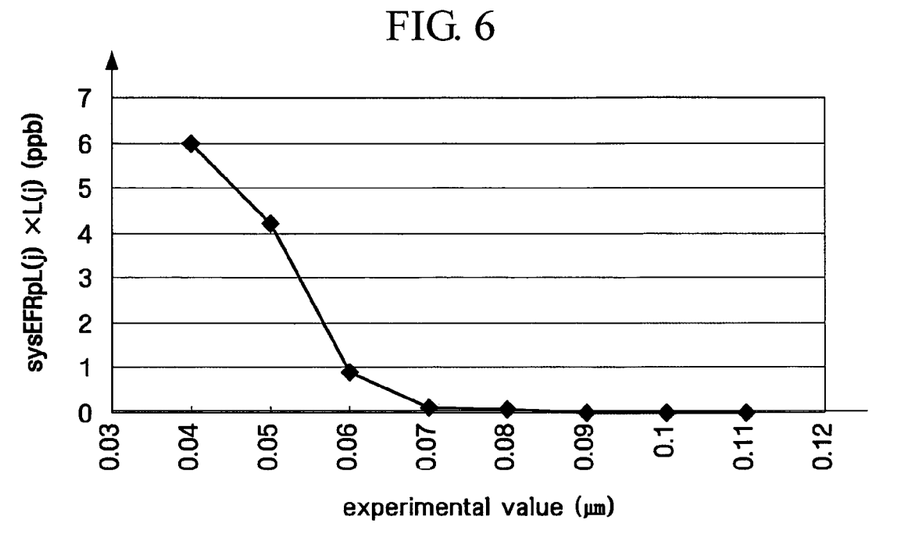
FIG. 6 illustrates a diagram of step S50 of FIG. 1.

Based on Equation 2, the experimental value-based systematic fault rate per unit hole length and the length of the side of the hole 1, which may be calculated for each of the experimental values within the layout of interest, may be multiplied by each other to thereby calculate sysEFRpL(j)×L(j), where sysEFRpL(j)×L(j) has units of ppb, as illustrated in FIG. 6. The calculated sysEFRpL(j)×L(j)s may be summed, thereby calculating the systematic fault rate of the hole.

Meanwhile, the method of acquiring the systematic fault rate of a hole 1 according to a preferred embodiment of the invention is not limited to Equation 2. As an illustration, one may use a method of assigning different weights to the systematic fault rates of experimental values that are of particular interest and to the systematic fault rates of experimental values that are not of particular interest. For example, the systematic fault rate of the experimental value of about 0.04 μm, which may occur in the minimum design rule value, has a great effect on yield, and 0.04 μm is thereby assigned a weight larger than those of the systematic fault rates of other experimental values. That is, if a weight W(j) is assigned to sysEFRpL(j), which is the experimental value-based systematic fault rate per unit hole length which corresponds to the j-th experimental value, then the following Equation 3 can be calculated.

$$sysFR = \sum_{j=1}^{n} W(j) \times sysEFRpL(j) \times L(j) \qquad \text{(Equation 3)}$$

Afterwards, the systematic yield of the hole may be calculated using the systematic fault rate of the hole at step S60.

In step S60, the systematic yield of the hole within the layout of interest may be calculated using the following Equation 4. $C_{yield}(0 \leq C_{yield} \leq 1)$ may be a yield constant which represents variation in the yield occurring for reasons other than the above-described variation in yield due to the design rule.

$$\text{Yield} = C_{yield} \times \exp(-sysFR) \qquad \text{(Equation 4)}$$

In the exemplary method of enhancing the yield of semiconductor integrated circuit devices according to this embodiment of the invention, the Poisson model may be utilized. However, the invention is not limited to the Poisson model. One of ordinary skill in the art will appreciate that the yield can be calculated using another model, e.g., a negative binomial model.

Next, with respect to the hole 1 and the shape surrounding the hole 1 in the desired layout, the distance between the side of the hole 1 and the opposing side of the shape may be corrected at step S70.

In step S70, the systematic yield of the hole 1 may be recalculated after the correction, and the systematic yields before and after the correction may be compared to each other. Whether the corrected layout of interest must be re-corrected is determined, after which the layout may be re-corrected. For example, when the systematic yield after correction fails to increase by 5% compared to the systematic yield after correction, the layout of interest may be re-corrected.

Alternatively, the corrected layout of interest may be re-corrected until the systematic yield after correction achieves a predetermined target systematic yield. In this case, the systematic yield before correction may not be calculated and only the systematic yield after correction may be calculated.

Furthermore, in an embodiment of the invention, the systematic yields before and after the correction may be compared to each other, or the systematic yield after correction of the desired layout may be compared to the target systematic yield. However, the invention is not limited to this type of comparison. That is, the systematic fault rates of a hole 1 before and after correction may be compared without comparing systematic yields, or the systematic fault rate of the hole 1 after correction may be compared to a target systematic fault rate. The reason for this arises from the systematic yield of a hole 1 being proportional to the systematic fault rate of the hole 1, as seen in Equation 4.

Figure 7:
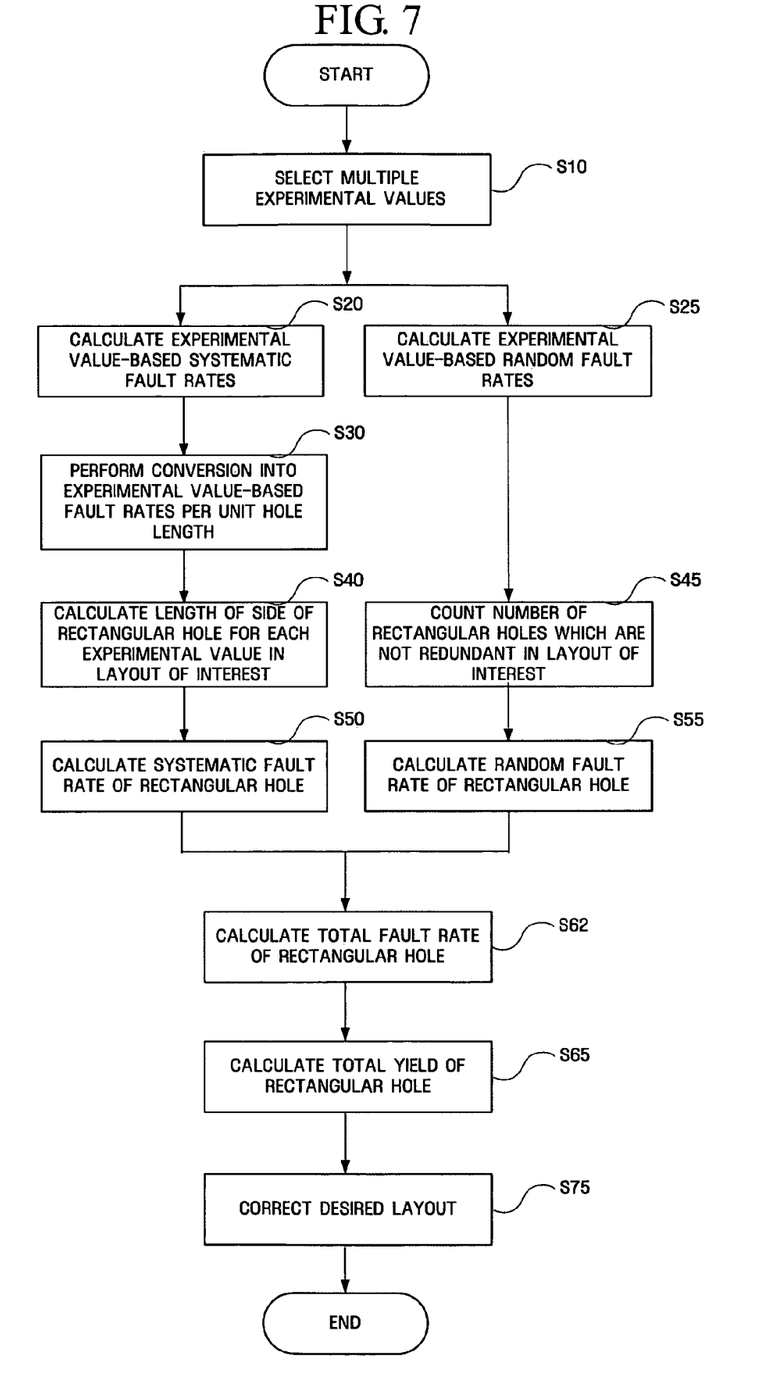
FIG. 7 illustrates a flowchart of a preferred method of enhancing the yield of semiconductor integrated circuit devices according to another embodiment of the invention.

FIG. 7 illustrates a flowchart of a method of enhancing yield according to another embodiment of the invention. For convenience of description, the same reference numerals are used for components that are substantially the same as in FIG. 1. Detailed descriptions thereof are therefore omitted.

In step S10 of FIG. 7, multiple experimental values may be determined for the distance between sides of the hole 1 and opposite sides of the shape surrounding the hole 1.

Next, multiple experimental value-based systematic fault rates and experimental value-based random fault rates may be calculated at steps S20 and S25. As described above, test patterns representing each of the experimental values may be formed, and the experimental value-based fault rates of the hole may be calculated. Then, the experimental value-based fault rates of the hole 1 may be calculated while the calculated experimental value-based fault rates are classified into either experimental value-based fault rates or experimental value-based random fault rates.

Thereafter, using the experimental value-based fault rates and the experimental value-based random fault rates, the systematic fault rate and random fault rate of the hole 1 may be calculated in the layout of interest at steps S30, S40, S45 and S55.

In detail, the systematic fault rate of the hole 1 may be calculated through steps S30, S40 and S50, as described with reference to FIG. 1. The number of holes that are not redundant in the desired layout may be counted at step S45. Then, the counted number of holes that are not redundant and the experimental value-based random fault rate may be multiplied by each other, thereby calculating the random fault rate of the holes at step S55.

Afterwards, by using the systematic fault rate and random fault rate of the hole 1, the total fault rate of the hole 1 in the desired layout may be calculated at step S62.

In step S62, the total fault rate of the hole 1 may be calculated by simply adding the systematic fault rate and the random fault rate of the holes. Alternately, the total fault rate of the hole 1 may be calculated by assigning a weight to a value that is of particular interest and then performing addition.

The total yield of the holes may be calculated using the total fault rate of the hole 1 at step S65. Although the total yield of the hole 1 may be calculated using a Poisson model or a negative binominal model, the invention is not limited to these models.

Next, with respect to the hole 1 and the shape surrounding the hole 1, the distance between a side of the hole 1 and an opposing side of the shape may be corrected in consideration of the total yield of the hole 1 at step S75.

Although not shown in the drawings, a mask manufactured using the method of enhancing the yield of semiconductor integrated circuit devices described above with reference to FIGS. 1 to 7 may belong within the technical scope of the preferred embodiments of the invention.

Furthermore, a semiconductor integrated circuit device manufactured using the mask also may belong within the technical scope of the preferred embodiments of the invention.

Figure 8:
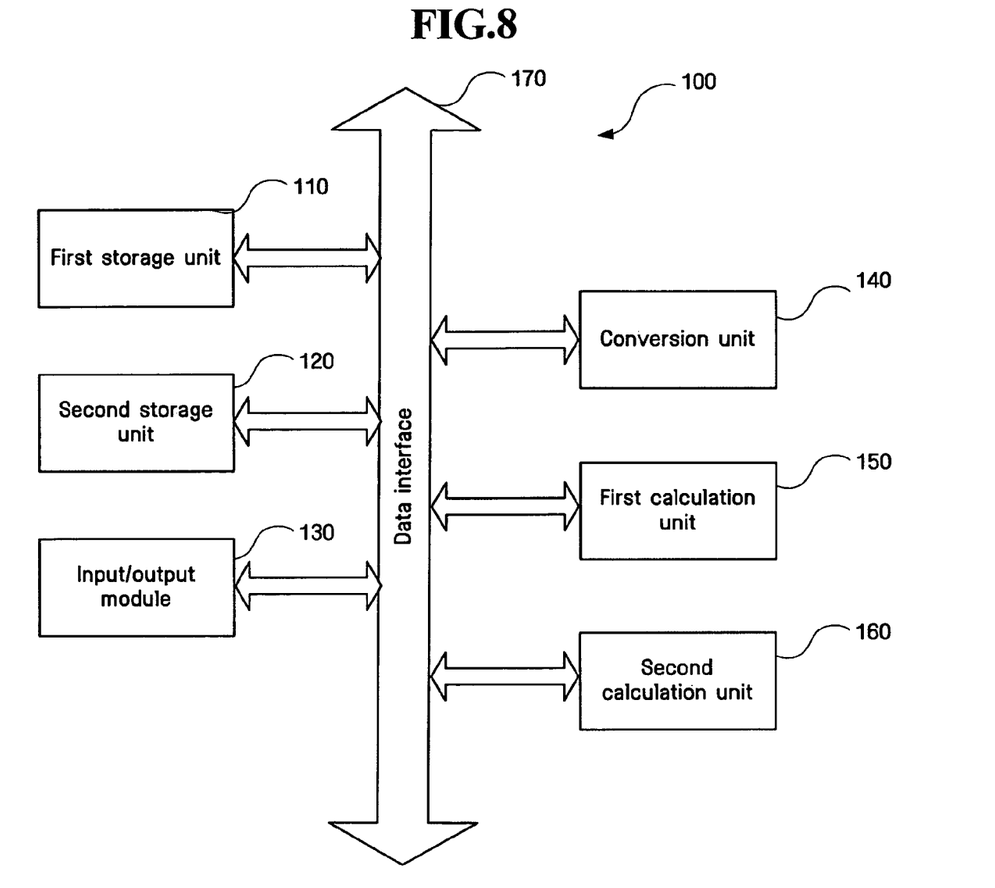
FIG. 8 illustrates a block diagram of a system for enhancing the yield of semiconductor integrated circuit devices according to a preferred embodiment of the invention.

FIG. 8 illustrates a block diagram of a system for enhancing the yield of semiconductor integrated circuit devices according to a preferred embodiment of the invention.

In FIG. 8, the system 100 for enhancing the yield of semiconductor integrated circuit devices may include first and second storage units 110 and 120, an input/output module 130, a conversion unit 140, and first and second calculation units 150 and 160. The respective units may communicate with each other via a data interface 160 and/or another communication link.

Data stored in the first and second storage units 110 and 120 may be values directly stored through the input/output module 130 or values calculated by a separate calculation unit (not shown). In this case, the first storage unit 110 may store multiple experimental values determined for the distance between a side of a hole 1 and the shape surrounding the hole 1. The second storage unit 120 may store experimental value-based systematic fault rates of the holes calculated from multiple test patterns after multiple test patterns corresponding to the respective experimental values have been formed on a wafer.

The conversion unit 140 may convert the experimental value-based systematic fault rate into the experimental value-based systematic fault per unit hole length using the length of a side of the hole 1 of the test pattern. The first calculation unit 150 may calculate the length of a side of the hole 1, in which the distance between the side of a hole 1 and the opposite side of a line or polygon corresponds to an experimental value. The second calculation unit 160 may receive the experimental value-based systematic fault per unit hole length from the conversion unit 140 and the length of the side of the hole 1 calculated for each of experimental values in the layout of interest from the first calculation unit 150. The second calculation unit 160 may then calculate the systematic fault rate of the hole 1.

Figure 9:
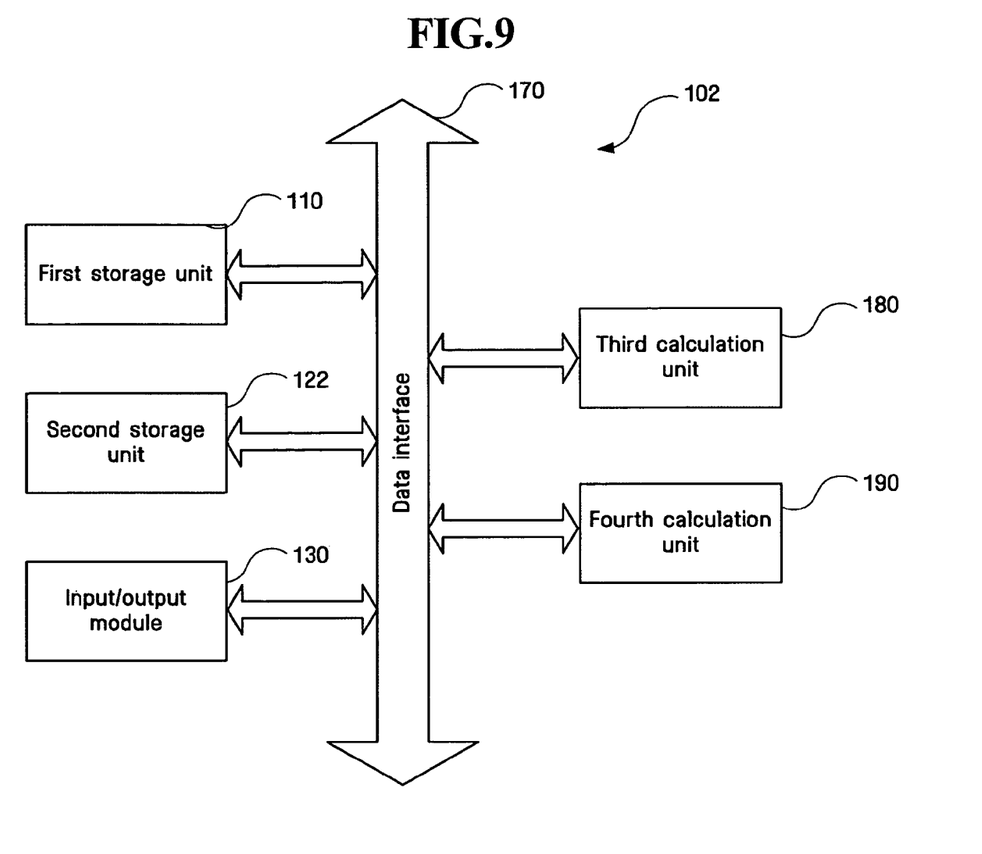
FIG. 9 illustrates a block diagram of a system for enhancing the yield of semiconductor integrated circuit devices according to another preferred embodiment of the invention.

FIG. 9 illustrates a block diagram of a system for enhancing the yield of semiconductor integrated circuit devices according to another embodiment of the invention. The same reference numerals are used for components that are substantially the same as in FIG. 8, and detailed descriptions thereof are omitted.

In FIG. 9, the system 102 for enhancing the yield of semiconductor integrated circuit devices may include first and second storage units 110 and 122, an input/output module 130, and third and fourth calculation units 180 and 190. The respective units may communicate with each other via a data interface 170 or other communication link. The first storage unit 110 may store multiple experimental values determined for the distance between the side of the hole 1 and the opposite side of the shape surrounding the hole 1. The second storage unit 122 may store experimental value-based random fault rates and experimental value-based systematic fault rates, these rates being acquired in such a way that multiple test patterns representing each of the experimental values may be formed on a wafer. Experimental value-based fault rates of the hole 1 may accordingly be measured by counting a number of test patterns in which fault occurs among the multiple test patterns for each of the experimental values. The experimental value-based fault rates may then be classified into the experimental value-based random fault rates and the experimental value-based systematic fault rates.

The third calculation unit 180 may receive the experimental value-based random fault rate and the experimental value-based systematic fault from the second storage unit 122, and the third calculation unit 180 may calculate the random fault rate and systematic fault rate of the hole 1 in the layout of interest. The fourth calculation unit 190 may receive the random fault rate and systematic fault rate of the hole 1 from the third calculation unit 180, and then may calculate the total fault rate of the hole 1.

Although not shown in the drawings, a mask manufactured using the method of enhancing the yield of semiconductor integrated circuit devices described above with reference to FIGS. 8 and 9 may belong within the scope of the invention.

Furthermore, a semiconductor integrated circuit device manufactured using the mask may also belongs within the scope of the invention.

As described above, according to the above-described method and system for enhancing the yield of semiconductor integrated circuit devices, it may become possible to calculate the systematic fault rate of a hole using the distances between the sides of the hole and the opposite sides of the shape surrounding the hole, and to correct the layout of interest using the systematic fault rate, thereby maximizing the semiconductor yield.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of enhancing yield of semiconductor integrated circuit devices by implementing a system, the method comprising:
   determining a plurality of experimental values, each experimental value corresponding to a distance from a side of a hole to an opposing side of a shape surrounding the hole, the hole being polygonal in structure, and storing the plurality of experimental values in a first storage unit in the system;
   forming a plurality of test patterns representing each of the experimental values on a wafer;
   calculating experimental value-based systematic fault rates from the plurality of test patterns, and storing the experimental value-based systematic fault rates in a second storage unit in the system;
   converting each of the experimental value-based systematic fault rates of the hole into experimental value-based systematic fault rates per unit hole length using a length of sides of the hole, the length of sides of the hole being a sum of lengths of all sides of the hole, of each of the test patterns by a conversion unit in the system;
   calculating a length of a side of the hole for which a distance between the side of the hole and the opposing side of the shape corresponds to each of experimental values in a desired layout by a first calculation unit in the system; and
   calculating a systematic fault rate of the hole using the experimental value-based systematic fault rates per unit hole length and the length of a side of the hole calculated for the each of experimental values in the desired layout by a second calculation unit in the system.

2. The method as claimed in claim 1, wherein the experimental values are taken at increments of a predetermined interval from a minimum design rule value for the distances between the sides of the hole and the opposing sides of the shape surrounding the hole.

3. The method as claimed in claim 2, wherein the predetermined interval is a design grid or a multiple of the design grid.

4. The method as claimed in claim 1, wherein calculating experimental value-based systematic fault rates includes:
   counting a number of test patterns in which at least one fault occurs among the plurality of test patterns on the wafer corresponding to each of the experiment values;
   measuring experimental value-based fault rates of the hole; and
   classifying the measured experimental value-based fault rates into experimental value-based random fault rates and experimental value-based systematic fault rates.

5. The method as claimed in claim 4, wherein the experimental value-based fault rates converge to a specific value as the experimental value increases, and the experimental value-based random fault rates have a convergence value and each experimental value-based systematic fault rate is a difference between an associated experimental value-based fault rate and experimental value-based random fault rate.

6. The method as claimed in claim 1, wherein, in the each of test patterns, the distances between four sides of the hole and four sides of the shape surrounding the hole are uniform, and
   converting the experimental value-based systematic fault rates of the hole into the experimental value-based systematic fault rates per unit hole length by the conversion unit includes dividing each of the experimental value-based systematic fault rates by a sum of lengths of the four sides of the hole, thereby converting the experimental value-based systematic fault rate per unit hole length.

7. The method as claimed in claim 1, wherein calculating the length of a side of the hole in the desired layout for each of the experimental values is performed by calculating the length of side of the hole for each non-redundant hole in the desired layout for each of the experimental values by the first calculation unit.

8. The method as claimed in claim 1, wherein:
at least one of the sides of the hole includes a plurality of sub-sides, and distances between the sub-sides of the hole and the opposite sides of the shape are different; and
calculating the length of the side of the hole, for which the distance between a side of the hole and the opposite side of the shape corresponds to each of the experimental values, comprises calculating a length of one of the sub-sides of the hole, for which the distance between the one sub-side of the hole and an opposing side of the shape corresponds to each of the experimental values by the first calculation unit.

9. The method as claimed in claim 1, wherein calculating a systematic fault rate of the hole is performed by the second calculation unit using the following equation:

$$sysFR = \sum_{j=1}^{n} sysEFRpL(j) \times L(j)$$

where the systematic fault rate of the hole is sysFR, a number of the plurality of experimental values is n, the experimental value-based systematic fault rate per unit hole length which corresponds to a j-th experiment value is sysEFRpL(j), and the length of the side of the hole which is calculated in relation to a j-th experiment value within the desired layout is L(j).

10. The method as claimed in claim 1, further comprising calculating a systematic yield of the hole using the systematic fault rate of the hole; and
correcting the distances between the sides of the hole and the opposing sides of the shape in the desired layout taking into consideration the systematic yield.

11. A method of enhancing yield of semiconductor integrated circuit devices by implementing a system, the method comprising:
determining a plurality of experimental values, each experimental value corresponding to a distance from a side of a hole to an opposing side of a shape surrounding the hole, the hole being polygonal in structure, and storing the plurality of experiment values in a first storage unit in the system;
forming a plurality of test patterns representing each of the experimental values on a wafer;
counting a number of test patterns in which a fault occurs;
measuring experimental value-based fault rates of the hole;
classifying the measured experimental value-based fault rates into experimental value-based random fault rates and experimental value-based systematic fault rates, and storing the experimental value-based random fault rates and experimental value-based systematic fault rates in a second storage unit in the system;
calculating a random fault rate and a systematic fault rate of the hole for a desired layout using the experimental value-based random fault rates and the experimental value-based systematic fault rates by a first calculating unit in the system; and
calculating a total fault rate of the hole in the desired layout using the random fault rate and systematic fault rate of the hole by a second calculation unit in the system.

12. The method as claimed in claim 11, wherein the experimental value-based fault rates converge to a specific value as the experimental value increases, the experimental value-based random fault rates have a convergence value, and each experimental value-based systematic fault rate is a difference between an associated experimental value-based fault rate and experimental value-based random fault rate.

13. The method as claimed in claim 11, wherein calculating a random fault rate of the hole is performed by multiplying a number of non-redundant holes in the desired layout by the experimental value-based random fault rate.

14. The method as claimed in claim 11, wherein calculating a systematic fault rate of the hole by the first calculation unit includes:
converting the experimental value-based systematic fault rates of the hole into experimental value-based systematic fault rates per unit hole length using a length of the sides of the hole of each of the test patterns;
calculating a length of a side of the hole, for which the distance between the side of the hole and the opposing side of the shape corresponds to each of experimental values in the desired layout; and
calculating a systematic fault rate of the hole using the experimental value-based systematic fault rates per unit hole length and the length of a side of the hole calculated for the each of experimental values in the desired layout,
wherein, in the each of the test patterns, the distances between four sides of the hole and four sides of the shape surrounding the hole are uniform.

15. The method as claimed in claim 14, wherein converting the experimental value-based systematic fault rates of the hole into the experimental value-based systematic fault rates per unit hole length includes:
dividing each of the experimental value-based systematic fault rates by a sum of lengths of four sides of the hole, thereby converting the experimental value-based systematic fault rates per unit hole length.

16. The method as claimed in claim 14, wherein the calculating the length of a side of the hole in the desired layout for each of the experimental values is performed by calculating the length of a side of the hole or each non-redundant hole in the desired layout for each of the experimental values.

17. The method as claimed in claim 14, wherein:
at least one of the sides of the hole includes a plurality of sub-sides, and distances between sub-sides of the hole and the opposing sides of the shape are different; and
calculating the length of a side of the hole, for which the distance between the side of the hole and the opposite side of the line corresponds to each of the experimental values, includes calculating a length of one of the sub-sides of the hole for which the distance between the one sub-side of the hole and an opposing side of the shape corresponds to each of the experimental values.

18. A system for enhancing yield of semiconductor integrated circuit devices, the system comprising:
a first storage unit storing a plurality of experimental values determined for distances between sides of a hole, the hole being polygonal in structure, and opposing sides of a shape surrounding the hole;
a second storage unit storing experimental value-based systematic fault rates of the hole calculated from a plurality of test patterns after the plurality of test patterns representing each of the experimental values have been formed on a wafer;

a conversion unit converting the experimental value-based systematic fault rates into experimental value-based systematic fault rate per unit hole length using a length of sides of the hole, the length of sides of the hole being a sum of lengths of all sides of the hole, of each of the test patterns;

a first calculation unit calculating a length of a side of the hole, for which a distance between the side of a hole and the opposing side of the shape corresponds to an experimental value in a desired layout; and a second calculation unit receiving the experimental value-based systematic fault rates per unit hole length from the conversion unit and the length of a side of the hole calculated for each of experimental values in the desired layout from the first calculation unit and calculating a systematic fault rate of the hole.

19. A mask manufactured using the system as claimed in claim 18 for enhancing yield of layouts of semiconductor integrated circuit devices.

20. A semiconductor integrated circuit device manufactured using the mask as claimed in claim 19.

* * * * *